Dec. 10, 1946.   B. G. SUTTON   2,412,232
VALVE
Filed April 16, 1943

INVENTOR
BERNARD G. SUTTON
BY
J. C. Baisch

Patented Dec. 10, 1946

2,412,232

UNITED STATES PATENT OFFICE 2,412,232

VALVE

Bernard G. Sutton, Algonac, Mich., assignor to Bendix Aviation Corporation, South Bend, Ind., a corporation of Delaware Application April 16, 1943, Serial No. 483,243

10 Claims. (Cl. 210—165)

This invention relates to filters and more particularly to by-pass valves therefore.

Filters used to filter fluid (such as lubricants, fuel or anti-icing fluids for aircraft, or the like) under pressure to machines, engines, or other devices have filter elements which often become clogged or plugged with dirt and other foreign matter. When this occurs there will be a failure in the supply of the fluid which may result respectively in serious damage to said machines; failure of the engine, or icing of the parts normally supplied with anti-icing fluid.

It is therefore an important object of the present invention to provide a by-pass valve which will permit fluid passing through the filter to by-pass the filter element when the latter becomes so clogged or plugged with dirt or other foreign matter that little or no fluid can pass therethrough.

It is another object of the present invention to provide a device of this character which can be readily used in present standard types of filters, particularly those wherein the edge type of filter element is used.

Filters generally are provided with a bowl, i. the lower portion or sump in which some of the foreign matter strained out of the fluid by the filter element collects and it is therefore still another object of the invention to provide a device of this character wherein the by-pass valve is adapted to be secured between the filter element and the head of the filter where it is relatively remote from said bottom or sump portion of the filter.

Other objects of the invention are to provide a device of this character that is reliable and sturdy, that is simple in construction and operation, and that readily lends itself to inexpensive manufacture in large quantities by automatic machinery.

Further objects and advantages of the invention will become apparent from the following description taken in connection with the accompanying drawing, in which.

Figure 1:
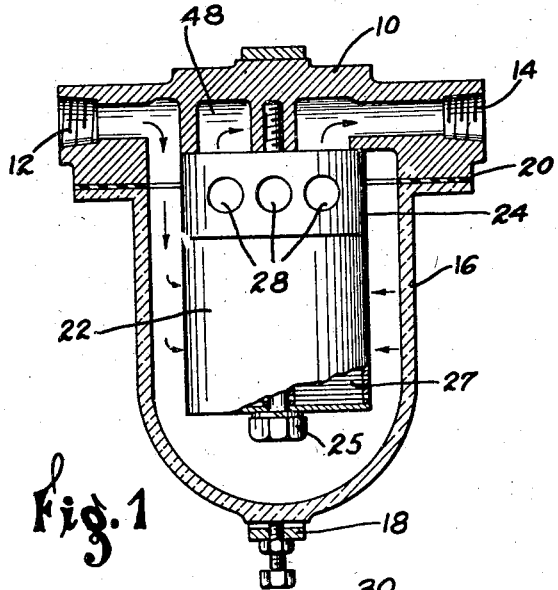
Figure 1 is a vertical section through a filter embodying the present invention.

While several preferred embodiments of the invention are shown in the accompanying drawing and herein described in detail, it is to be understood that the disclosure is given solely for the purpose of illustrating the invention and is not intended as a limitation thereof to the constructions disclosed, the appended claims being intended to cover all modifications and alternative constructions falling within the scope of the invention.

Throughout the drawing similar reference characters represent similar parts although where said parts are modified in structure and operation they are given a further differing reference character.

Referring first to Figure 1 there is illustrated a well known type of filter which includes a filter head 10 having a fluid inlet 12 and an outlet 14. A bowl 16, which may be of transparent material, connects the inlet and the outlet together and is attached to the head 10 by means of the usual clamp 18, there being a gasket 20 interposed between the bowl and the head of the filter to prevent leakage between these parts. The filter also includes the usual cylindrical filter element 22 which comprises a plurality of stacked washers of known character between which are narrow filtering passages or spaces extending between the periphery of the element and vertical fluid passages within same, said filter element being interposed between the inlet 12 and the outlet 14 for straining or filtering out foreign matter entrained in the fluid passing through said filter. Generally much of such foreign matter collects on the exterior of the filtering element although some of it also falls to the bottom of the bowl and accumulates there.

Figure 3:
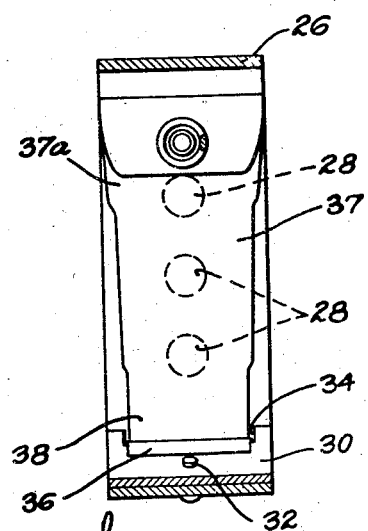
Figure 3 is a view taken on line 3—3 of Figure 2.
Figure 4:
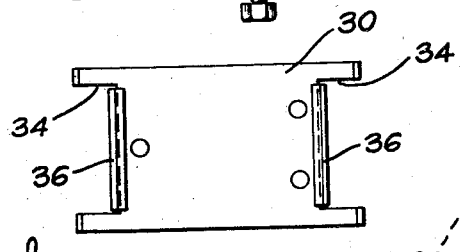
Figure 4 is a plan view of the hinge plate of the device.
Figure 2:
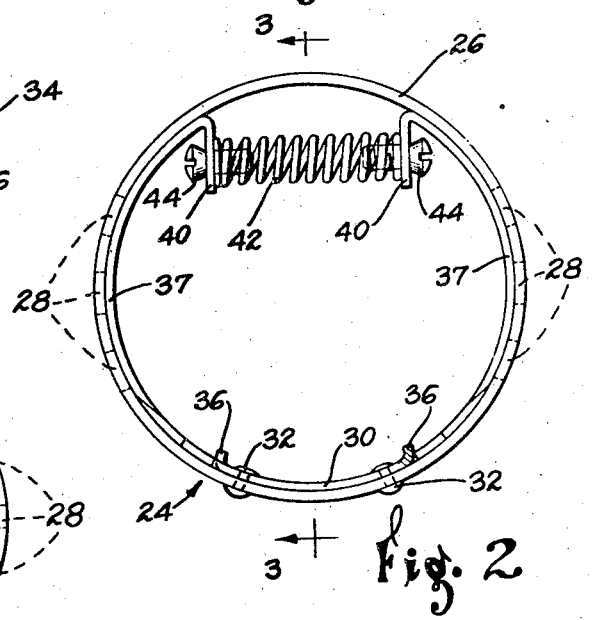
Figure 2 is an enlarged plan view of a preferred embodiment of the present valve per se.

The present valve, indicated generally at 24, is of substantially the same outside diameter as the filter element 22 and is interposed between said element and the filter head 10 where the least amount of dirt will pass through the valve when it is open as it is remotely positioned relative to the bottom of the bowl 16 where dirt and other sediment collects. The valve is tightly secured in the above described position by the usual screw 25 used to attach said element to the filter head. The valve 24 comprises an annular or cylindrical body 26 having two groups of fluid passages 28 therein, which are disposed on opposite sides of the body and between which is a hinge plate 30, Figures 2, 3, and 4, secured to the inside of said body by rivets 32. Each end of said hinge plate 30 is notched, as indicated at 34, and is provided with an upturned ear 36 extending transversely of the plate. The groups or sets of passages 28 are normally closed by respective arcuate valve members 37 conforming to the curvature of the body and having portions 37a of substantially the same width as the length of the body and ends 38 of reduced width which are received in respective notches 34 and abut against respective ears 36, the latter being so formed as to be inclined somewhat over the adjacent ends of the respective valve members ends to prevent same from becoming accidentally disengaged from the notches 34. The free end of each valve member is turned inwardly at 40 and when said members are assembled in the body 26 as shown in Figures 2 and 3 said ends are in spaced parallel relationship to each other with a spring 42 disposed therebetween. The spring 42 is retained in position by screws 44 and is adapted to yieldingly urge the valve members into tight contact with the interior of the body 26 thereby normally closing the passages 28.

In standard filters of well known type having an edge type filter element the fluid enters the inlet 12 as indicated by the arrow therein, flows into the bowl 16, thence into the filter element 22 from the periphery thereof and through vertical fluid passages 27 in said element which discharge into a chamber 48 having a connection with the outlet 14. When the filter element is clean the pressures inside and outside the valve body 24 are substantially equal, the inside pressure being somewhat less than the outside pressure as a result of the pressure drop through the filter element but the pressure difference being insufficient to move the valve plates 37 against the force of spring 42.

With use the gradual accumulation of dirt and other foreign matter on the filter element so plugs or clogs the filtering passages of the latter that in time little or no fluid will pass through said element. The pressure of the lubricant in the bowl will build up under such conditions and force the valve members 37 inwardly thereby permitting the fluid to enter the chamber 28 and pass on to the outlet 14 thereby insuring the passage of an emergency supply of fluid through the filter.

Figure 5:
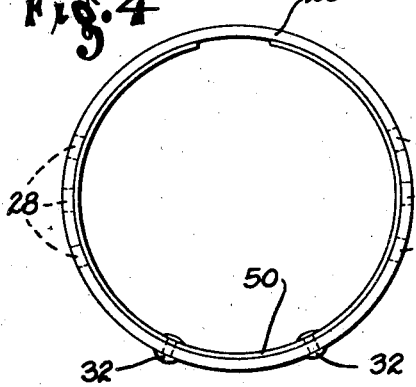
Figure 5 shows a modification of the present invention.

Referring to the embodiment shown in Figure 5 the modified device includes the annular body 26 within which is disposed a resilient valve member 50 which conforms to the interior curvature thereof. The member 50 is secured to the body 26 by rivets 32 located intermediate the free ends thereof, which normally close the respective groups of passages 28 and are spaced apart sufficiently to insure their free movement.

Should the filter element 22 become clogged the pressure of the fluid in bowl 16, transmitted through the passages 28, will cause the free ends of the member 50 to be forced inwardly and permit fluid to by-pass said filter element.

Should the direction of fluid flow through the filter be the reverse from that described above, the member 50 may be attached to the outside of the body 26 to permit the flow of fluid from the interior to the exterior of said body 26.

It is to be noted that while the invention is shown and described in connection with filters using edge type filter elements for filtering lubricants said invention may be used in connection with filters using other types of filter elements and filtering other types of fluids and from the foregoing it is thought that the invention and many of its attendant advantages will be understood and it will be apparent that various changes may be made in the form, construction and arrangement of the parts without departing from the spirit and scope of the invention or sacrificing its material advantages.

I claim:
1. In a valve for fluid filters, a cylindrical body, two groups of fluid passages in said body disposed on opposite sides thereof; a hinge plate secured to the interior of the body between the groups of fluid passages, said plate having a notch in each end thereof, an upturned ear along the closed end of each notch and extending transversely of the plate, an arcuate valve member for each group of passages adapted to fit against the interior wall of the body, each of said valve members having an end received in a respective notch and pivoting against the ear thereof, the latter being inclined over said end of the valve member, and yielding means urging the valve members into close contact with the interior wall of the body.

2. The invention defined by claim 1 wherein the free ends of the valve members include a flanged portion between which said yielding means is adapted to react.

3. In a filter for fluids: a filter head having inlet and outlet passages therein, a substantially cylindrical filter element interposed between said passages and removably attached to the filter head in a manner such that fluid to be filtered is caused to pass through said element to the outlet passage, means providing a by-pass for the fluid to be filtered in the event the filter element becomes clogged comprising a substantially cylindrical plain tube-like body open at both ends and of substantially the same outside diameter as that of the filter element, said body being secured between the filter head and the filter element and having a fluid passage in the cylindrical wall thereof which when open permits fluid to flow direct from the inlet to the outlet passage, a hinged valve member normally closing the fluid passage in said tube-like body, and means yieldingly urging said hinged valve member to closed position.

4. In a filter: a head having fluid passages therein; a cylindrical edge type filter element interposed between said passages and removably attached to the head; a removable valve interposed between the filter element and head, and secured to the latter by said element, said valve comprising a cylindrical body; two groups of fluid passages in said body disposed on substantially opposite sides thereof; a hinged plate secured to the interior of the body between the groups of fluid passages, said plate having a notch in each end thereof; an upturned ear at the closed end of each notch and extending transversely of the plate; an arcuate valve member for each group of passages adapted to seat against the interior wall of a body, each of said valve members having an end received in a respective notch and pivoting against the ear thereof, the latter being inclined over said end of the valve member; and yielding means urging the valve members into close contact with the interior wall of the body.

5. In a filter for fluids: a filter head having inlet and outlet passages therein; a filter element; a stem extending from one end of said element, and being so constructed and arranged as to threadably secure the element to the head; a tubular valve body open at the ends and having a port in the tubular wall thereof, said valve body being disposed about the stem and clamped between the filter element and the filter head; and means yieldingly closing the port in the valve body.

6. In a filter for fluids: a filter head having inlet and outlet passages therein; a filter element; means extending from one end of said element and being so constructed and arranged as to secure the element to the head; a tubular valve body open at the ends and having a port in the tubular wall thereof, said valve body being disposed about the first mentioned means and clamped between the filter element and the filter head; and a closure adapted to normally close said port.

7. In a filter for fluids: a filter head having inlet and outlet passages therein; a filter element; a stem extending from one end of said element and being so constructed and arranged as to detachably secure the element to the head; a tubular valve body open at the ends and having a port in the tubular wall thereof, said valve body being disposed about the stem and being clamped between the filter element and the head; a resilient valve member conforming to the shape of the body and means for attaching a portion of the valve member to the body whereby a free end of said valve member is adapted to normally close the port.

8. In a filter for fluids: a filter head having inlet and outlet passages therein; a filter element; a stem extending from one end of said element and being so constructed and arranged as to threadably secure the element to the head; a tubular valve body open at the ends and having a plurality of spaced ports in the tubular wall thereof, said valve body being disposed about the stem in spaced relation thereto and being clamped between the filter element and the filter head; a resilient valve member conforming to the shape of the body; and means for attaching an intermediate portion of the valve member to the valve body intermediate the ports whereby the free ends of said member normally close said ports.

9. In a filter for fluids: a hollow filter bowl provided with a filter head having inlet and outlet passages for the fluid to be filtered, a substantially cylindrical filter element, a stem so constructed and arranged as to removably secure the filter element to the filter head between said passages and in spaced relation to said head; and a valve for by-passing fluid around the filter element in the event the latter becomes clogged, said valve comprising a plain tube open at both ends and disposed about said stem between the filter and said head and providing a cylindrical wall normally barring the passage of fluid between the filter element and that portion of the filter head which lies between said passages, said tube having a fluid passage in the wall thereof which when open permits fluid to by-pass the filter element, and a resilient valve member secured to the interior of said tube and having a free end portion normally closing the passage in said tube.

10. In a filter for fluids: a filter head having inlet and outlet passages therein, a substantially cylindrical edge-type filter element interposed between said passages, a stem attached to the head and supporting the filter element, means providing a confined space around the filter element in communication with the inlet passage, fluid to be filtered flowing into said space from the inlet passage and thence through said element to the outlet passage, and means providing a by-pass for the fluid to be filtered in the event the filter element becomes clogged comprising a tube disposed about said stem between the filter element and said head, said tube having a port in the wall thereof which when open permits fluid to flow from said inlet through said port direct to said outlet, a plate mounted in said tube, an arcuate valve member pivotally attached to said plate and normally closing said port, and means yieldingly urging said valve member towards port-closing position.

B. G. SUTTON.